US012463314B2

(12) United States Patent
Nakamura et al.

(10) Patent No.: US 12,463,314 B2
(45) Date of Patent: Nov. 4, 2025

(54) AIR-COOLED COOLING STRUCTURE AND ANTENNA DEVICE

(71) Applicant: KABUSHIKI KAISHA TOSHIBA, Tokyo (JP)

(72) Inventors: Shingo Nakamura, Tokyo (JP); Hideki Fujii, Kawasaki Kanagawa (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 1 day.

(21) Appl. No.: 18/441,388

(22) Filed: Feb. 14, 2024

(65) Prior Publication Data

US 2024/0291132 A1 Aug. 29, 2024

Related U.S. Application Data

(63) Continuation of application No. PCT/JP2022/040053, filed on Oct. 27, 2022.

(30) Foreign Application Priority Data

Oct. 27, 2021 (JP) ................................ 2021-175316
Aug. 5, 2022 (JP) ................................ 2022-125587

(51) Int. Cl.
*H01Q 1/02* (2006.01)
*H01Q 1/42* (2006.01)

(52) U.S. Cl.
CPC ................ *H01Q 1/02* (2013.01); *H01Q 1/42* (2013.01)

(58) Field of Classification Search
CPC .................................. H01Q 1/02; H01Q 1/42
See application file for complete search history.

(56) References Cited

U.S. PATENT DOCUMENTS

2021/0313666 A1* 10/2021 Castronova .............. H01Q 1/02
2022/0115760 A1 4/2022 Ji et al.

FOREIGN PATENT DOCUMENTS

CN 112448116 A 3/2021
CN 215989266 U * 3/2022 ............ H01Q 21/00
EP 1 271 455 A1 1/2003
GB 2514612 A 12/2014
JP H9-288169 A 11/1997
JP H11-317618 A 11/1999
JP 2003-1633 A 1/2003

(Continued)

OTHER PUBLICATIONS

Toshiba Corporation, “Drone Detection System for Counter-Unmanned Aerial Systems,” Toshiba Review Science and Technology Highlights 2023, 1 page, https://www.global.toshiba/ww/technology/corporate/review/2023/high2023.html (2023).

(Continued)

*Primary Examiner* — Hoang V Nguyen
(74) *Attorney, Agent, or Firm* — Finnegan, Henderson, Farabow, Garrett & Dunner, LLP

(57) ABSTRACT

According to an embodiment, in an air-cooled cooling structure that cools the heating element with air, the air-cooled cooling structure includes a support member that supports the heating element on the inner face and an air guide portion. The air guide portion generates a spiral air flow with the extension direction of the support member as an axis. Furthermore, the air guide portion may include a fan that forcibly generates the air flow.

17 Claims, 19 Drawing Sheets

(56) References Cited

FOREIGN PATENT DOCUMENTS

| | | | | | |
|---|---|---|---|---|---|
| JP | 2003-179429 | A | | 6/2003 | |
| KR | 20210001874 | A | * | 1/2021 | ........... H01Q 21/061 |
| WO | WO 2014/132233 | A2 | | 9/2014 | |
| WO | WO-2014191756 | A1 | * | 12/2014 | ............... H01Q 1/02 |

OTHER PUBLICATIONS

Japan Patent Office, International Search Report for PCT/JP2022/040053, 3 pages, and translation, 2 pages (Jan. 10, 2023).

European Patent Office, Extended European Search Report in EP App. No. 22887101.8, (Sep. 24, 2025).

* cited by examiner

AIR-COOLED COOLING STRUCTURE AND ANTENNA DEVICE

This application is a Continuation Application of PCT Application No. PCT/JP2022/040053, filed Oct. 27, 2022 and based upon and claiming the benefit of priority from prior Japanese Patent Applications No. 2021-175316, filed Oct. 27, 2021, and No. 2022-125587, filed Aug. 5, 2022, the entire contents of all of which are incorporated herein by reference.

FIELD

Embodiments of the present invention relate to an air-cooled cooling structure and an antenna device.

BACKGROUND

The antenna apparatus that detects radio waves emitted from the moving body such as a drone has come to play an important role in monitoring important facilities such as airports. For this type of application, an antenna apparatus having a coverage of approximately 360 degrees in the azimuth direction is often applied. In order to cover the orientation of 360°, there is a method of rotating a single antenna and a method of disposing a plurality of planar antennas in a substantially circular shape. For example, in a case of a phased array antenna having a detection region of about 90° in an azimuth direction (azimuth direction), when the phased array antenna is disposed in four directions, it is possible to monitor all directions of 360°.

In order to install the antenna apparatus outdoors, it is necessary to cover the antenna apparatus with a cover such as a radome for preventing droplets and dust. It is also necessary to consider cooling of the device. It is also required to achieve compactness while coping with a plurality of frequency bands. In addition to weight reduction, it is also desired to simplify the structure and further increase the cooling efficiency in order to increase reliability. When the cooling efficiency can be enhanced, power required for cooling can be saved, and a long life can be expected. This is a serious issue to be solved for applications requiring stable operation for 24 hours and 365 days.

BRIEF DESCRIPTION OF THE DRAWINGS (S)

DETAILED DESCRIPTION

According to an embodiment, in an air-cooled cooling structure that cools the heating element with air, the air-cooled cooling structure includes a support member that supports the heating element on the inner face and an air guide portion. The air guide portion generates a spiral air flow with the extension direction of the support member as an axis. Furthermore, the air guide portion may include a fan that forcibly generates the air flow.

In the embodiment, a cooling structure of a radar device or an antenna apparatus having a coverage area in a direction of approximately 360° is disclosed.

First Embodiment

Figure 1:
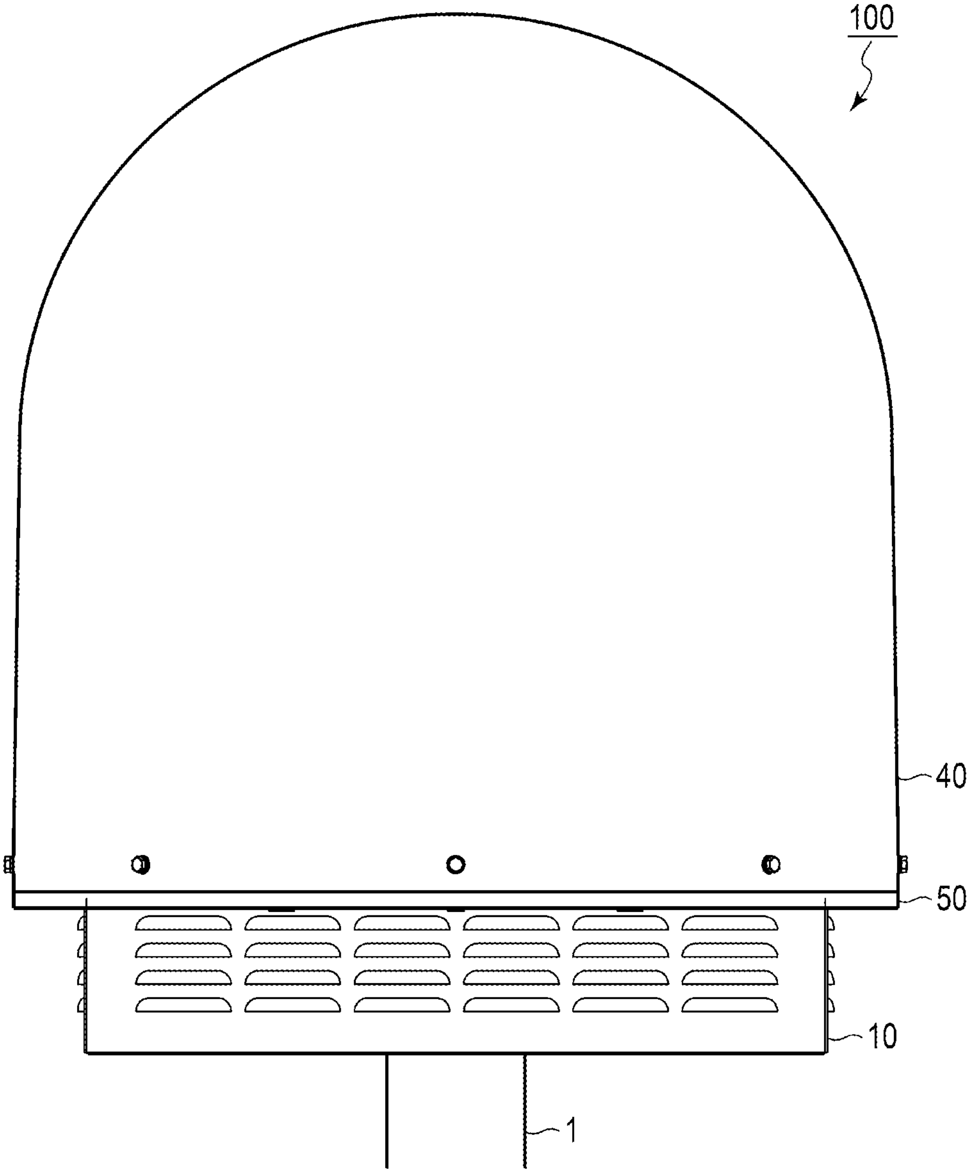
FIG. 1 is an external view illustrating an example of an antenna apparatus according to an embodiment.

FIG. 1 is an external view illustrating an example of an antenna apparatus according to a first embodiment. In FIG. 1, an antenna apparatus 100 is attached to a support column 1 fixed to the ground or a building. The support column 1 is fixed to a base plate 50. A radome 40 and an outer cooling unit 10 are fixed to the base plate 50. An electronic device including an antenna substrate, a signal processing unit, and the like is installed in the internal space formed by the radome 40 and the base plate 50. The radome 40 serves as a cover for protecting the electronic device from rain drops and dust.

In the first embodiment, an air-cooled cooling structure for air-cooling an electronic device inside the radome 40 will be described.

Figure 2:
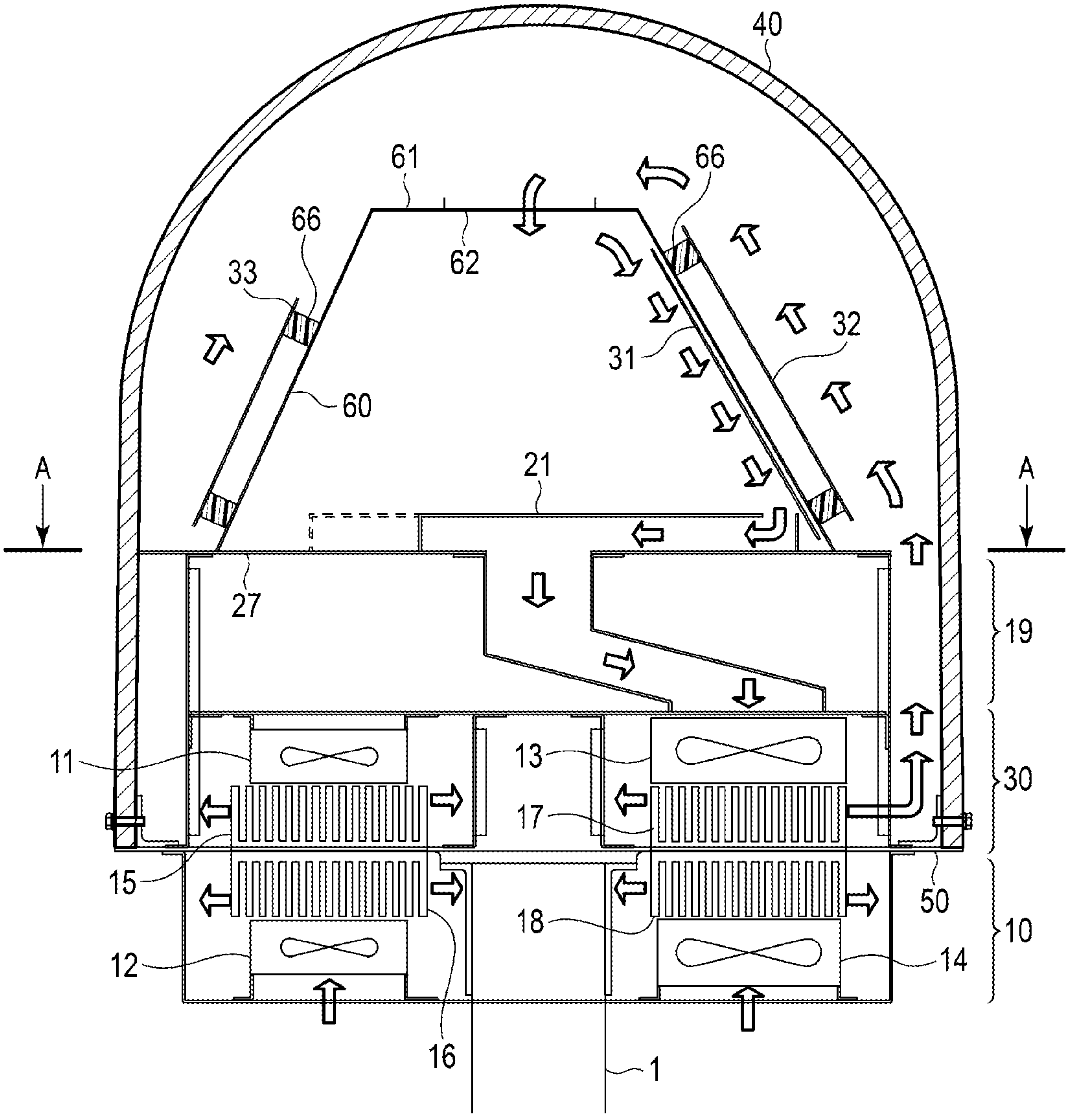
FIG. 2 is a transverse cross-sectional view illustrating an example of an antenna apparatus 100 shown in FIG. 1.

FIG. 2 is a transverse cross-sectional view illustrating an example of the antenna apparatus 100 shown in FIG. 1. In FIG. 2, an inner cooling unit 30 is fixed to the base plate 50. That is, the inner cooling unit 30 and the outer cooling unit 10 are set back to back with the base plate 50 interposed therebetween.

The inner cooling unit 30 includes radiators 15 and 17 as first heat transfer members attached to the base plate 50. The radiators 15 and 17 are attached back to back to the radiators 16 and 18 as the second heat transfer members with the base plate 50 interposed therebetween. The radiator 16 is thermally coupled to the radiator 15. The radiator 18 is thermally coupled to the radiator 17. As a result, heat inside the radome 40 is conducted to the outside via the radiators 15, 16, 17, and 18. Here, by using the pin fin type radiators 15, 16, 17, and 18, high heat dissipation performance can be expected. Of course, any one of the radiators 15, 16, 17, and 18 may be a pin fin type, and the other may be a normal fin type.

A COTS product mounting area 19 is provided away from the base plate 50 of the inner cooling unit 30 so as to be stacked vertically upward. The COTS product mounting area 19 is an area where so-called commercial-off-the-shelf (COTS) product portions such as a power supply and a hub are mounted, and includes a duct portion 21 having a Y-shape.

The fixing metal fitting 60 is further attached vertically above the COTS product mounting area 19.

The antenna substrates 32 and 33 are attached to the fixing metal fitting 60 from the outside via fixing bosses 66. A signal processing substrate 31 is attached to the fixing metal fitting, the signal processing substrate 31 being opposite to the antenna substrate 32. That is, the fixing metal fitting 60 as a fixing member serves as a support member that supports the antenna substrates 32 and 33 and the signal processing substrate 31 in the internal space of the radome 40. In addition, the fixing metal fitting 60 includes a coupling portion 61 having a ventilation hole 62, and serves as a ventilation guide that guides the air flow inside the radome 40 along the signal processing substrate 31.

The air flow in the internal space of the radome 40 is generated by the internal fans 11 and 13. Among them, the internal fan 13 is connected to the duct portion 21, and an air flow illustrated by an arrow in the drawing is generated by a suction force generated by the operation of the internal fan 13. This air flow circulates inside the radome 40, mainly takes heat from the signal processing substrate 31, and is blown to the radiator 17. The radiator 17 transfers heat of the air flow to the radiator 18, and the heat is dissipated to the outside by the wind generated by the outer fan 14 and discharged. On the other hand, heat generated in the COTS product mounting area 19 is taken out to the radiator 15 via an air flow blown to the radiator 16 by a suction force of the internal fan 11. This heat is dissipated to the outside by the wind generated by the outer fan 12 and discharged. In this manner, the internal space of the radome 40 is air-cooled.

Figure 3:
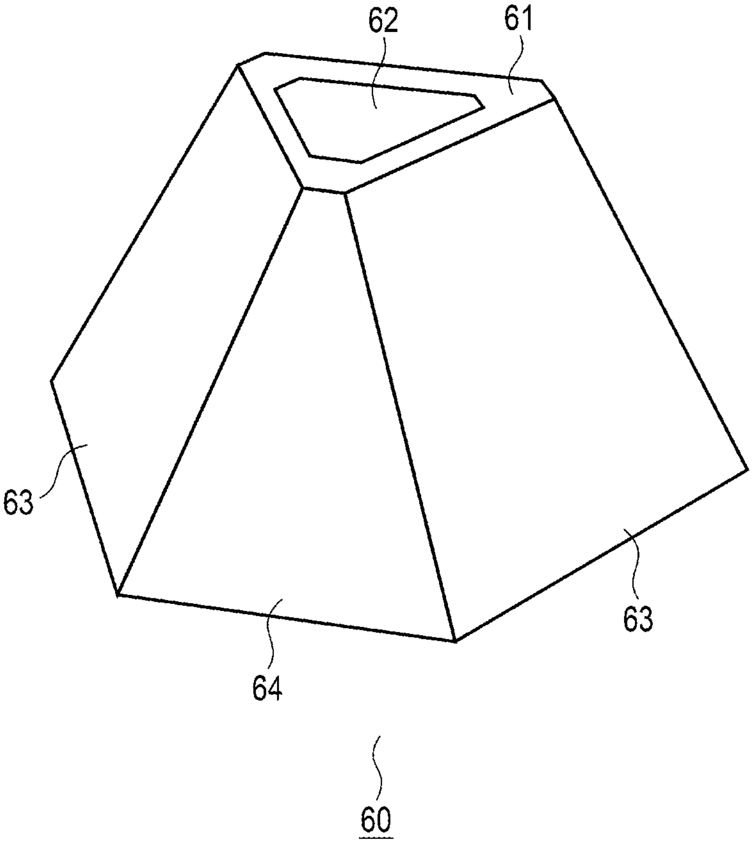
FIG. 3 is an external view illustrating an example of a fixing metal fitting 60.

FIG. 3 is an external view illustrating an example of the fixing metal fitting 60. The fixing metal fitting 60 is a polyhedron including three support faces 63 and three connection faces 64. Each of the support face 63 and the connection face 64 is an isosceles trapezoid, and both form an inclined face to support the antenna substrate at an elevation angle of, for example, 60°.

In the first embodiment, the support face 63 has a larger area than the connection face 64. The support face 63 and the connection face 64 are alternately connected at ridgelines of the polyhedron. That is, the connection face 64 is interposed between the support face 63 and the support face 63. The support face 63 and the connection face 64 are connected to the coupling portion 61 having the ventilation hole 62 at the top portion of the polyhedron.

The antenna substrate 32 is attached to the support face 63, and the antenna substrate 33 is attached to the connection face 64. In the first embodiment, the band of the antenna substrate 32 is defined as a band A, and the band of the antenna substrate 33 is defined as a band B higher than the band A.

Since the antenna substrate 33 handles radio waves in a higher frequency range than the antenna substrate 32, the antenna substrate 32 is larger in size. Therefore, the antenna substrate 32 is supported by the support face 63 having a larger area. Furthermore, the signal processing substrate 31 is attached to the fixing metal fitting, the signal processing substrate 31 being opposite to the antenna substrate 32, and the signal processing substrate 31 performs both the signal process for the antenna substrate 32 and the signal process for the antenna substrate 33. That is, the signal processing substrate 31 as the signal processing unit is electrically connected to both the antenna substrates 32 and 33 by a signal line or the like.

Figure 4:
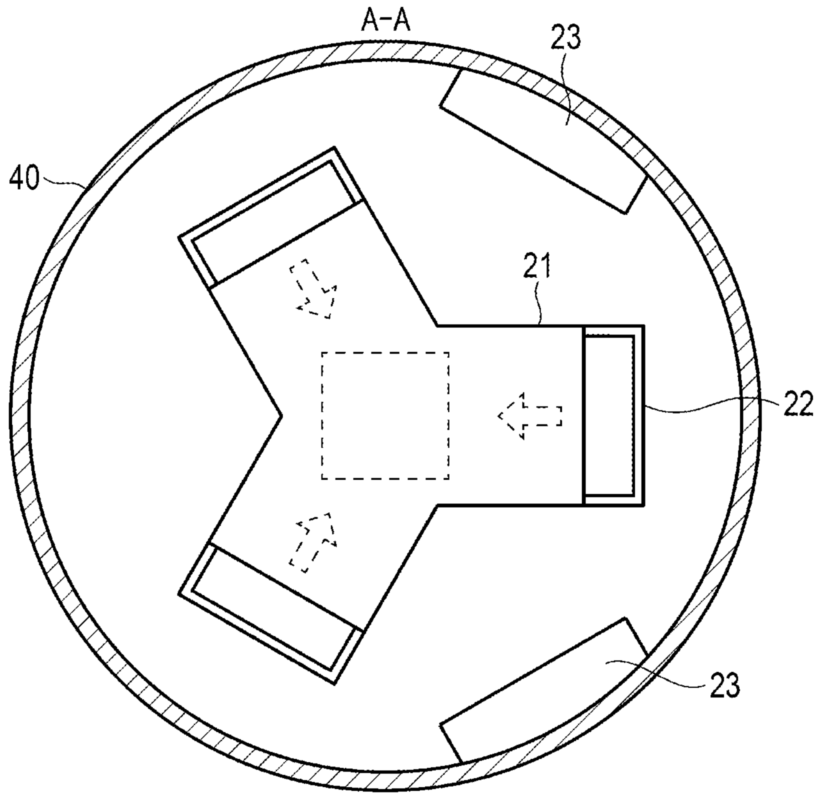
FIG. 4 is a cross-sectional view taken along line A-A of the antenna apparatus 100 illustrated in FIG. 2.

FIG. 4 is a cross-sectional view of the antenna apparatus 100 illustrated in FIG. 2 taken along line A-A. In FIG. 4, only the duct portion 21 is shown, and the fixing metal fitting 60 and the like are omitted. In FIG. 4, the duct portion 21 includes three air intakes 22, and an air flow by the internal fan 13 is sucked from the air intakes 22. In addition, two exhaust ports 23 are opened in a partition plate above the COTS product mounting area 19, and these exhaust ports serve to supply an air flow by the internal fan 13 along the antenna substrates 32 and 33.

Figure 5:
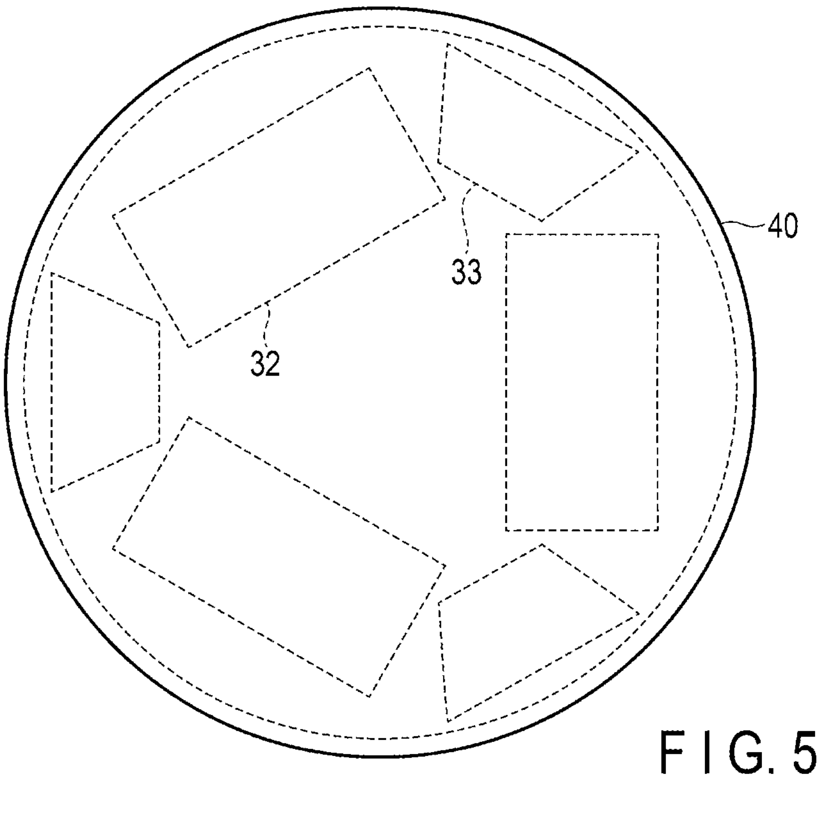
FIG. 5 is a view illustrating an example of an attached state of antenna substrates 32 and 33.

FIG. 5 is a view illustrating an example of an attached state of the antenna substrates 32 and 33. In FIG. 5, only antenna substrates 32 and 33 are illustrated, and the fixing metal fitting 60 and the like are omitted. The three antenna substrates 32 and the three antenna substrates 33 are alternately attached to the fixing metal fitting 60. When the antenna substrates 32 and 33 have the detection region of about 120° in the azimuth (azimuth) direction, all directions of 360° Can be monitored by the arrangement illustrated in FIG. 5. That is, radio waves arriving from all directions can be captured by one device.

Figure 6:
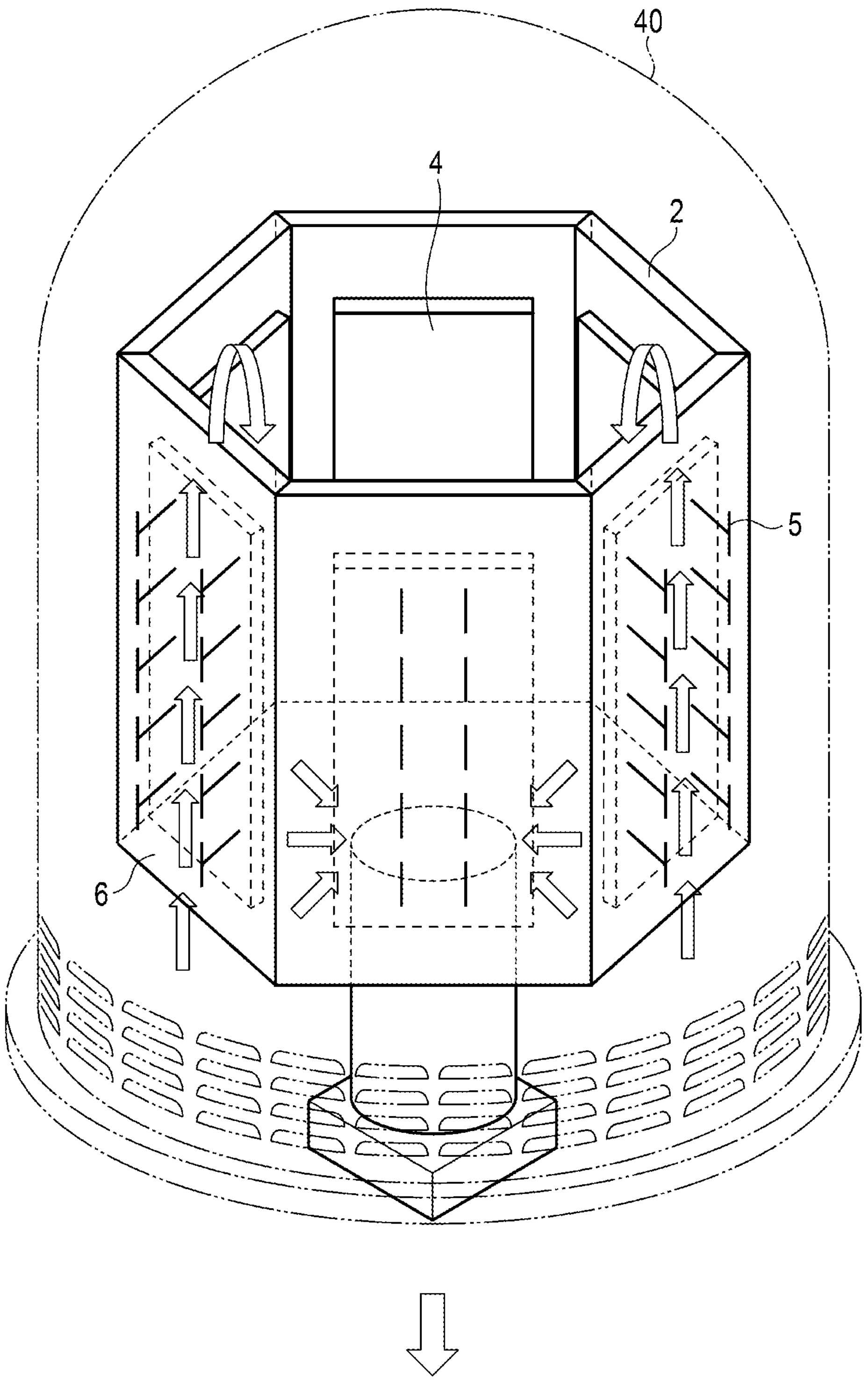
FIG. 6 is a perspective view illustrating an example of the antenna apparatus according to the embodiment.

FIG. 6 is a perspective view illustrating an example of the antenna apparatus according to the embodiment. The support member 2 whose six rectangular flat plates are bonded is stored inside the radome 40, and the heating element 4 such as a signal processing substrate is attached opposite each surface of the support member 2. The antenna elements 5 are exposed on the surface (support face 6) of the support member 2 and are disposed outward. In the configuration shown in FIG. 6, the air flow flows upwards along the support face 6 from below and is sucked inwards from the top of the support member 2. At this time, the air flow takes heat of the heating element 4 away and is finally discharged to the outside.

Figure 7:
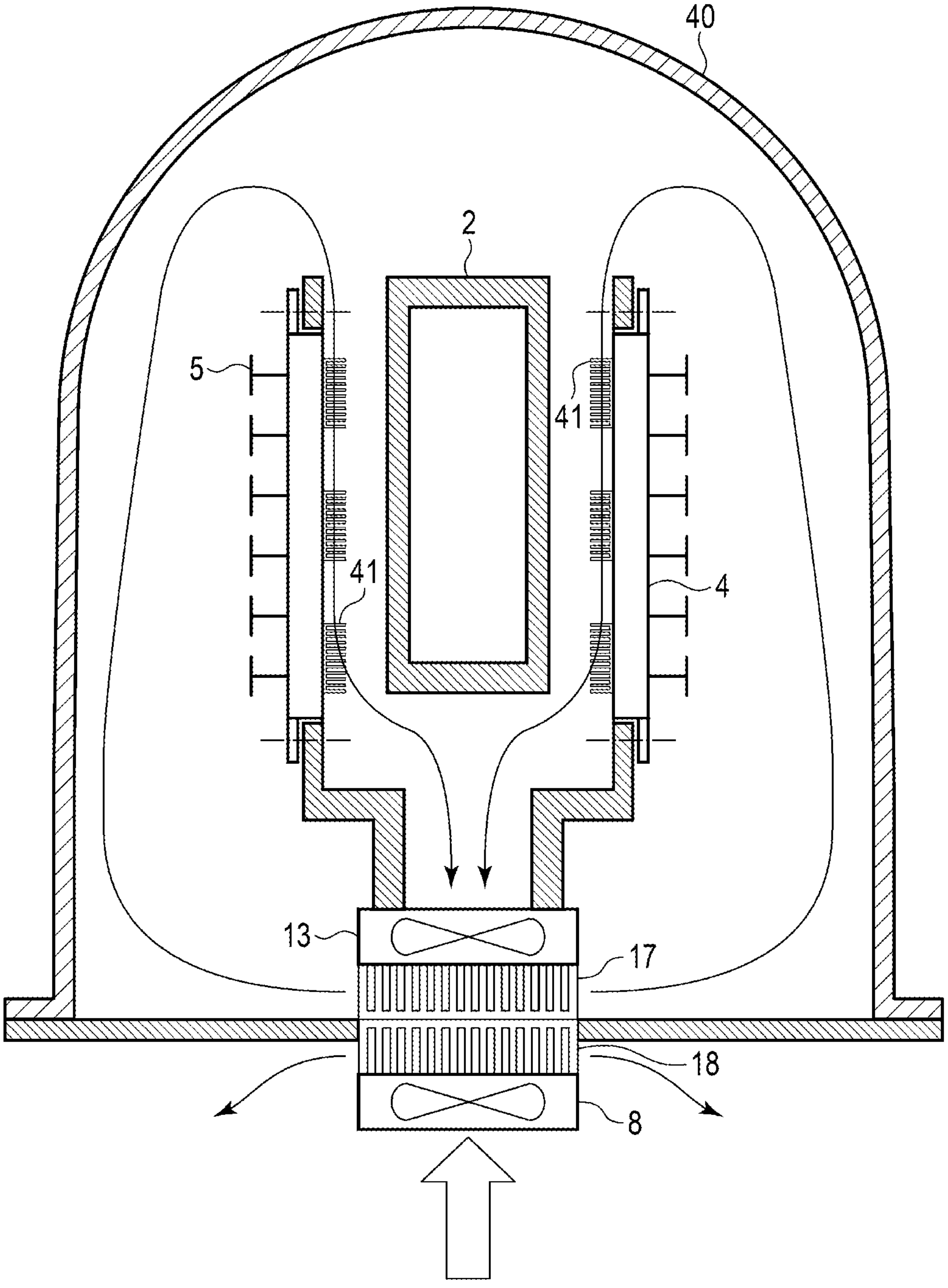
FIG. 7 is a transverse cross-sectional view illustrating another example of the antenna apparatus 100.

FIG. 7 is a transverse cross-sectional view illustrating another example of the antenna apparatus 100. FIG. 7 illustrates a structure for cooling the heating element 4 by indirect air cooling, and illustrates a case where the support member 2 has a rectangular parallelepiped shape in order to simplify the description. The radiator 41 is attached to the back face of the heating element supported by the support member 2.

When the internal fan 13 rotates, an air flow circulating in the lengthwise direction is generated in the internal space of the radome 40. This air flow hits the radiator 41 and takes heat from the heating element 4, and then reaches the radiator 17 at the lower portion. The radiator 17 is attached back to back to and thermally coupled to the radiator 18 outside the radome. Therefore, the heat of the radiator 17 is transferred to the radiator 18, and finally discharged to the outside of the radome 40 by the cooling air generated by an outer fan 8. With such a configuration, heat generated inside the radome 40 can be discharged to the outside of the radome 40 in a state where confidentiality is maintained.

Figure 8A:
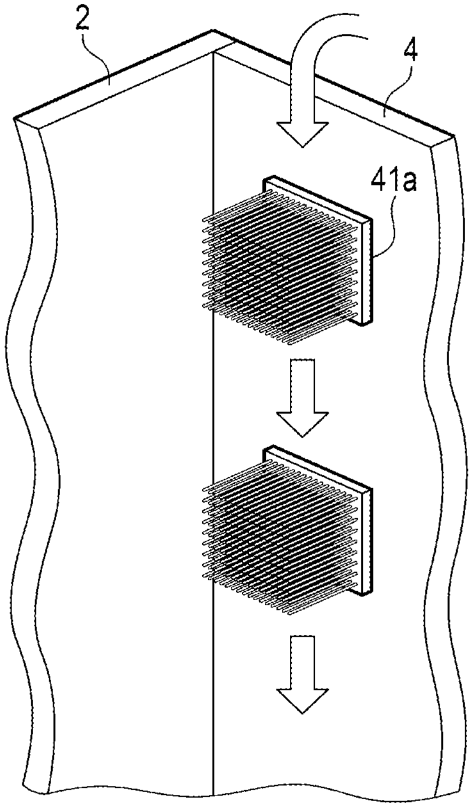
FIG. 8A is a view illustrating an example of a radiator 41.
Figure 8B:
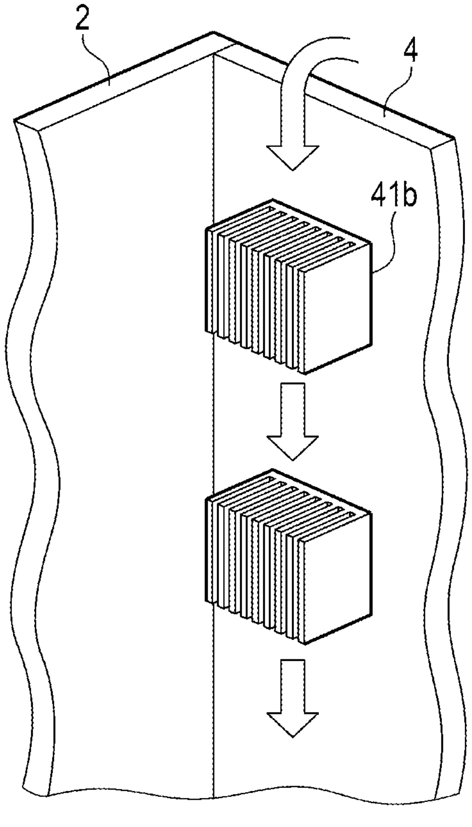
FIG. 8B is a view illustrating an example of a radiator 41.

FIG. 8 is a diagram illustrating an example of the radiator 41. FIG. 8A illustrates a pin fin type radiator 41*a*. FIG. 8B illustrates a slit-type radiator 41*b*. A radiator having an optimum shape may be selected in consideration of the respective materials, the direction of the air flow, and the like comprehensively.

Figure 9:
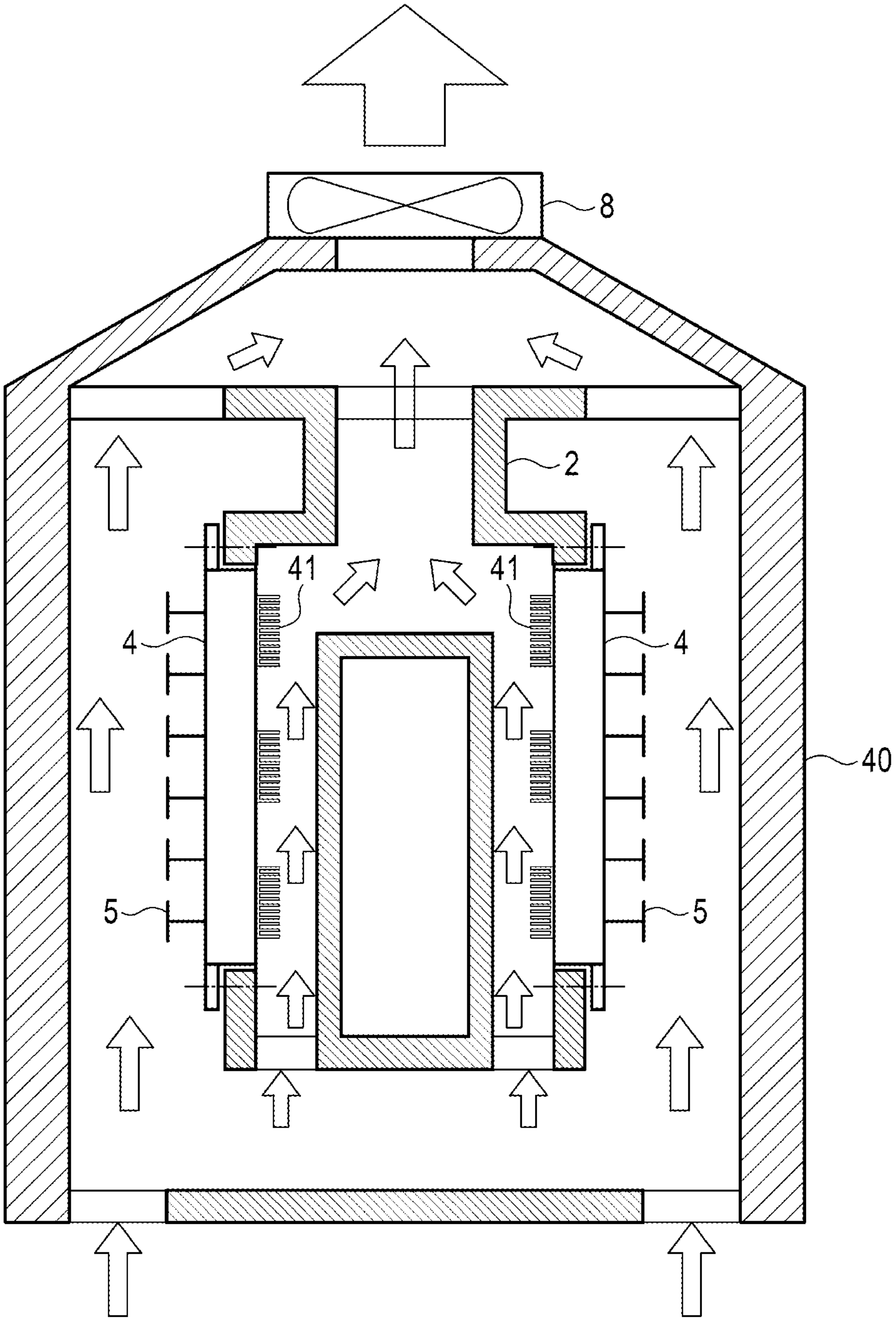
FIG. 9 is a transverse cross-sectional view illustrating another example of the antenna apparatus 100.

FIG. 9 is a transverse cross-sectional view illustrating another example of the antenna apparatus 100. FIG. 9 illustrates a cooling structure by direct air cooling in which externally introduced air is introduced into the radome 40 and exhausted again. When the outer fan 8 rotates, external air is taken in from an air intake opened in the bottom face of the radome 40, and an air flow is generated from the bottom to the top. The air flow flows upward along the outside of the support member 2 while taking heat from the heating element 4 and reaches the outer fan 8, and part of the air flow is sucked inside the support member 2 and hits the radiator 41. Then, the air flow reaches the outer fan 8 while taking heat from the heating element 4 via the radiator 41, and is exhausted to the outside. With such a configuration, heat inside the radome 40 can be discharged to the outside.

Figure 10:
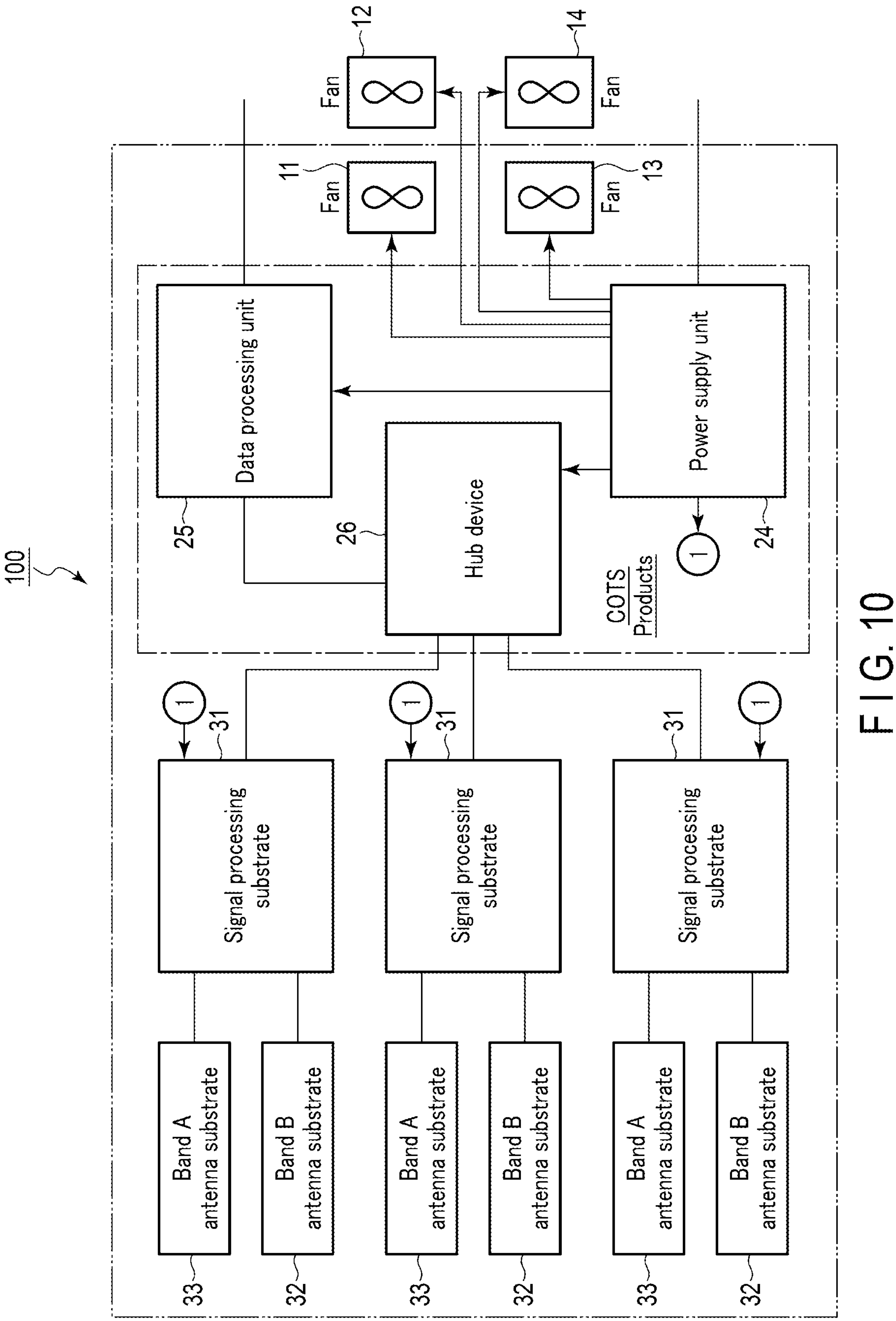
FIG. 10 is a block diagram illustrating an example of the antenna apparatus 100 according to the embodiment.

FIG. 10 is a block diagram illustrating an example of the antenna apparatus 100 according to the first embodiment. The antenna apparatus 100 includes the signal processing substrates 31 each connected to the antenna substrates 32 and 33, and each signal processing substrate 31 is supplied with power from a power supply unit 24. The power supply unit 24 also supplies driving power to the internal fans 11 and 13 and the outer fans 12 and 14.

Each of the signal processing substrates 31 performs reception process on the radio waves captured by the antenna substrates 32 and 33, and generates reception data. Each signal processing substrate 31 is connected to a hub device 26, and the reception data is transmitted to a data processing unit 25 via an in-device local area network (LAN) and processed. Note that, in FIG. 10, for example, the power supply unit 24, the hub device 26, and the data processing unit 25 correspond to COTS products.

As described above, in the first embodiment, the antenna substrates 32 and 33 of two frequency bands (band A/band B) are inclined by 60° in the radome and disposed on the circumference of the polyhedral fixing metal fitting 60. As a result, the entire circumference of 360° is set as the detection target. The signal processing substrate 31 is disposed inside relative to the antenna substrate 32 of the band A having a larger size.

COTS products such as the data processing unit 25, the hub device 26, and the power supply unit 24 connected to the antenna substrates 32 and 33 are disposed in a lower area (COTS product mounting area 19) below the substrates.

Sets of a fan and a radiator are disposed inside and outside the antenna apparatus 100 in order to cool each component against heat generation and to realize dustproof and drip-proof performance of the device. The internal fan circulates the cooling air to the heat generating portion and conducts heat between the radiators, and the outer fan releases the heat to the outside of the device.

In addition, the radiator is formed into a pin fin type so as to increase heat dissipation efficiency in the radiator, and air is blown to the radiator by a fan to flow in four directions.

In order to efficiently flow the cooling air to the heat generating portions of the substrates and the COTS products, the sets of the fan and the radiator is divided into the set for the substrates and the set for the COTS products, and individual ducts are installed.

The fixing metal fitting 60 has a hexagonal pyramid shape with a flat upper portion, and has a duct structure in which the ventilation hole 62 as an air hole is formed in the coupling portion 61 which is a flat portion and cooling air is blown into the substrates.

The signal processing substrate 31 includes a field programmable gate array (FPGA) and an integrated circuit (IC), and has a large degree of heat generation. Therefore, by disposing the signal processing substrate 31 inside relative to the fixing metal fitting 60 and providing the duct portion 21 branching in three directions on the bottom face of the fixing metal fitting 60, the cooling air flows along the face of the signal processing substrate 31. Further, COTS products are mounted on a shelf board (partition plate) 27 in the COTS product mounting area 19, and cooling air is efficiently applied to each component by ducts.

In view of the above, according to the first embodiment, it is possible to provide an air-cooled cooling structure and an antenna apparatus that are made compact without sacrificing cooling performance.

Second Embodiment

In the second embodiment, a spiral air flow is generated.

Figure 11:
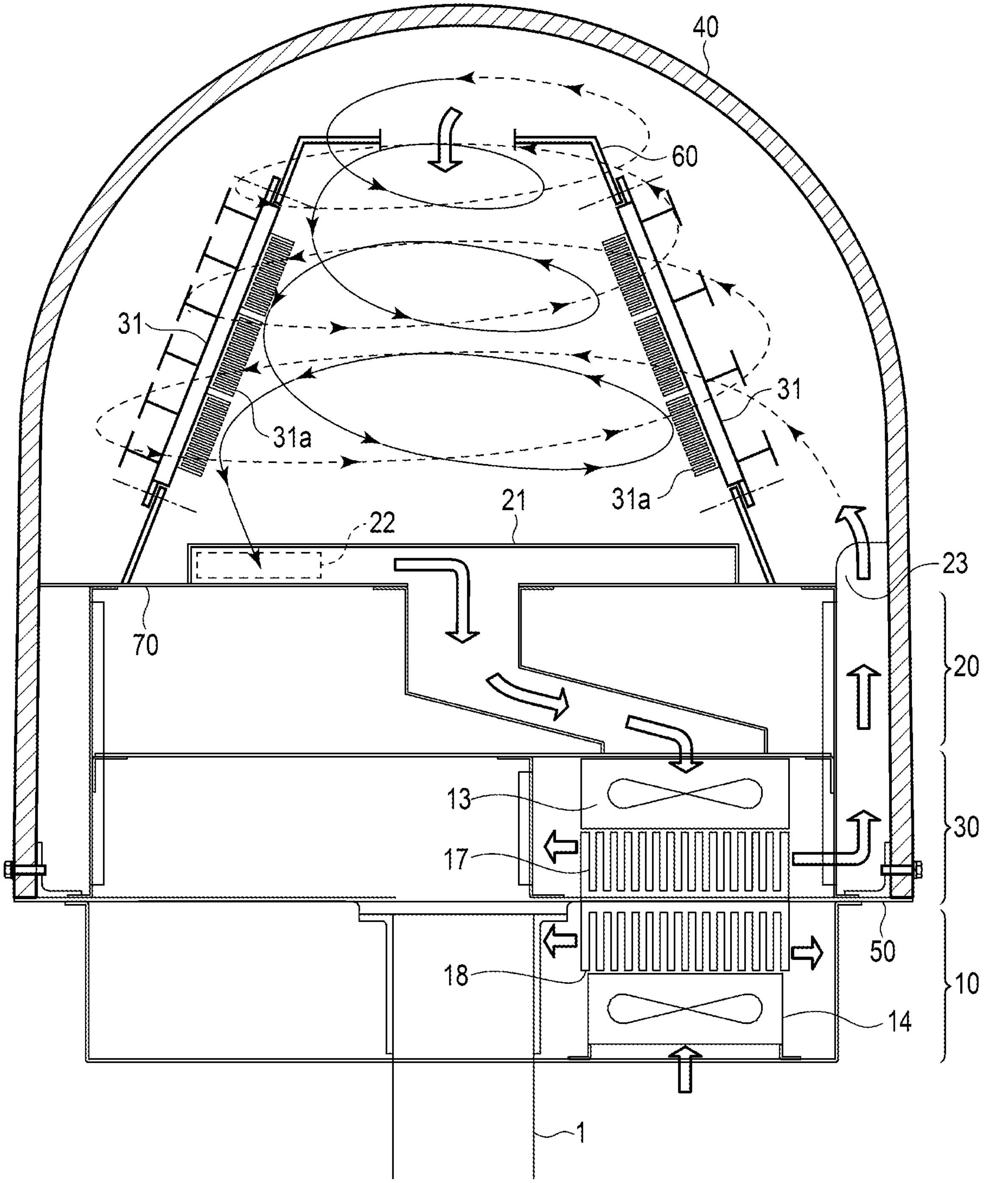
FIG. 11 is a transverse cross-sectional view illustrating an example of the antenna apparatus 100 in FIG. 1.

FIG. 11 is a transverse cross-sectional view illustrating an example of the antenna apparatus 100 shown in FIG. 1. In FIG. 11, the inner cooling unit 30 is fixed to the base plate 50. That is, the inner cooling unit 30 and the outer cooling unit 10 is fixed back to back with the base plate 50 interposed therebetween.

The inner cooling unit 30 includes the radiator 15 as a first heat transfer member attached to the base plate 50. The radiator 15 is attached back to back to the radiator 16 as the second heat transfer member with the base plate 50 interposed therebetween. The radiator 16 is thermally coupled to the radiator 15. When the outer fan 12 rotates and the outside air is blown to the radiator 16, the heat inside the radome 40 is dissipated to the outside via the radiator 16. This makes it possible to perform cooling without taking the air containing moisture, dust, and the like into the inside.

The duct portion 21 is formed in the space portion 20 vertically above the inner cooling unit 30. The duct portion 21 21 includes an air intake 22 that forms an air flow in the radome 40 into a spiral shape along the signal processing substrate 31 that is a heating element. The signal processing substrate 31 is a component including a field programmable gate array (FPGA) and an integrated circuit (IC) and having a large degree of heat generation.

The fixing metal fitting 60 as a fixing member is a support member that supports the signal processing substrate 31 in the internal space of the radome 40. A radiator 31*a* attached to the signal processing substrate 31 is exposed to the inside of the fixing metal fitting 60. When the spiral air flow inside relative to the fixing metal fitting 60 hits the radiator 31*a*, the heat of the signal processing substrate 31 is transferred to the air flow. The duct portion 21 accelerates the spiral flow due to the direction of the air intake 22, regulates the flow path of the air flow that has absorbed the heat of the signal processing substrate 31, and guides the air flow to the radiator 15.

The air flow in the internal space of the radome 40 is generated by the internal fan 11. The internal fan 11 is connected to the duct portion 21, and an air flow illustrated by an arrow in the drawing is generated by the relationship between the suction force generated by the operation of the internal fan 11 and the opening position of the air intake 22. A dotted arrow indicates an air flow flowing in a space sandwiched between the outside of the fixing metal fitting 60 and the inside of the radome 40, and a solid arrow indicates an air flow rotating in the inside of the fixing metal fitting 60. This air flow circulates in the inside of the radome 40, mainly takes heat from the signal processing substrate 31, and is blown to the radiator 15. The radiator 15 transfers heat of the air flow to the radiator 16, and the heat is dissipated to the outside by the wind generated by the outer fan 12 and discharged.

In FIG. 11, the signal processing substrate 31 is disposed on the circumference of the polyhedral fixing metal fitting 60 while inclined by 60° in the radome. As a result, the entire circumference of 360° is set as the detection target. Sets of a fan and a radiator are disposed inside and outside the antenna apparatus 100 to realize indirect air cooling.

In FIG. 11, the exhaust port 23 forms a spiral air flow outside the fixing metal fitting 60, and the air intake 22 forms a spiral air flow inside the fixing metal fitting 60. The present invention is not limited to this, and a spiral air flow may be generated only outside. In this case, it is sufficiently possible to generate a spiral air flow inside by the inertial force only by forming a tubular structure whose axis is aligned with the vertical line vertical to the intermediate plate 70.

In addition, it is possible to increase the cooling efficiency by forming a spiral air flow by providing only one of the air intake 22 and the exhaust port 23. By setting the holed position and direction of the air intake 22 and the blow-out direction of the exhaust port 23 to be angled sideways with respect to the vertical axis, it is possible to generate a spiral air flow by applying a sideways flow to an upward air flow caused by warm air.

Figure 12A:
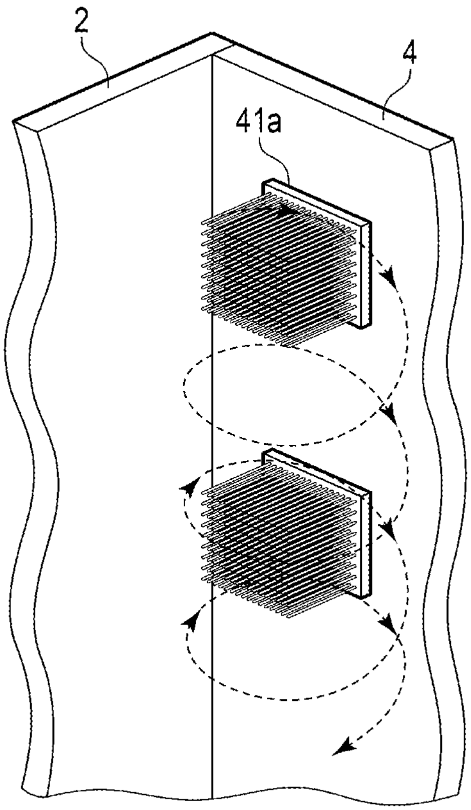
FIG. 12A is a view illustrating another example of the radiator 41.
Figure 12B:
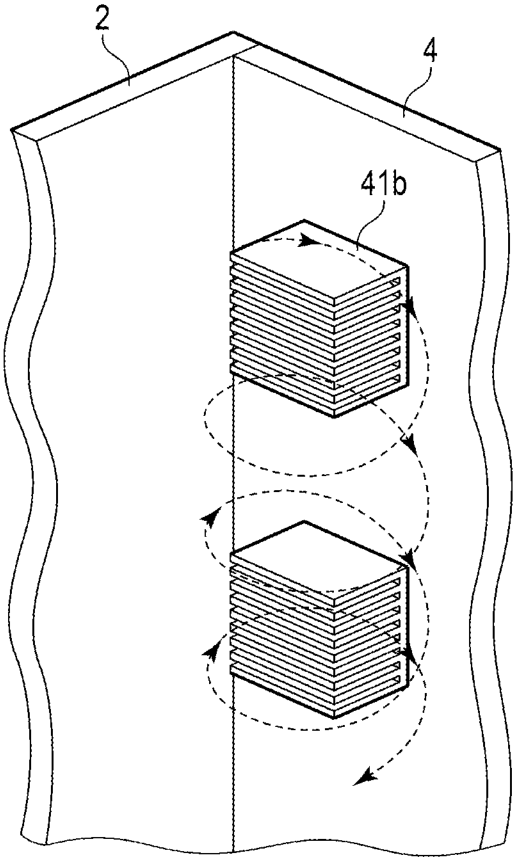
FIG. 12B is a view illustrating another example of the radiator 41.

FIG. 12 is a diagram illustrating another example of the radiator 41. As shown in FIG. 12A, a spiral air flow may hit the pin fin type radiator 41*a*, or as shown in FIG. 12B, a spiral air flow may hit the slit-type radiator 41*b*.

Figure 13:
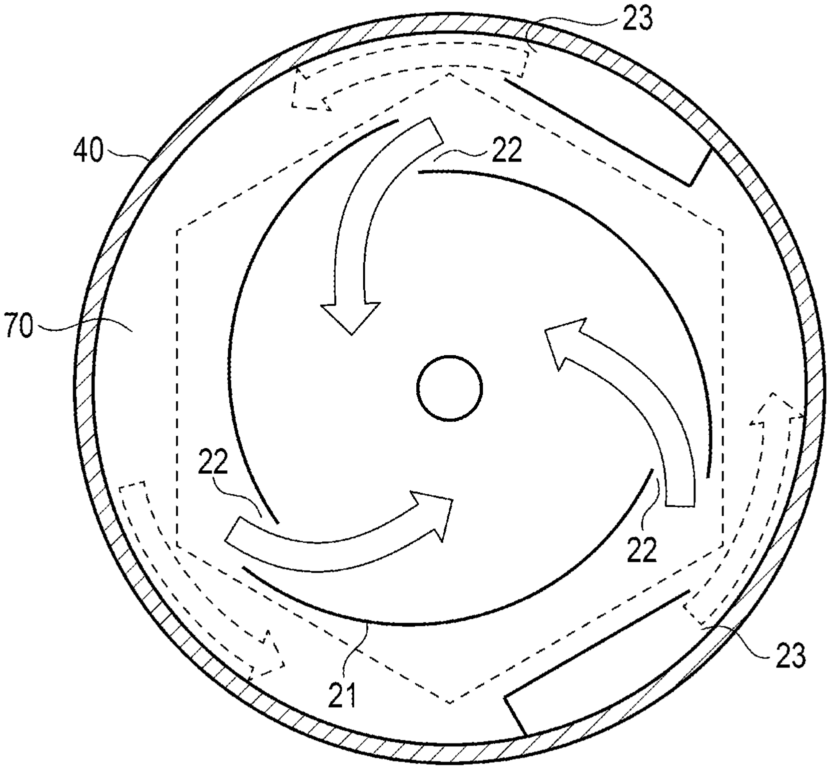
FIG. 13 is a longitudinal sectional view of the antenna apparatus 100 illustrated in FIG. 1.

FIG. 13 is a longitudinal sectional view of the antenna apparatus 100 illustrated in FIG. 11. The duct portion 21 includes three air intakes 22. The air flow by the internal fan 11 is sucked into the respective air intakes 22 in a spiral form. Since the air intake 22 opens on the side face of the duct portion 21, a rotational force is generated when air is sucked, and a spiral air flow is generated. This air flow hits the inner wall of fixing metal fitting 60 by the centrifugal force, and efficiently absorbs heat of the signal processing substrate 31.

In addition, two exhaust ports 23 are opened in the partition plate (intermediate plate 70) at the upper portion of the space portion 20, and these exhaust ports supply the air flow by the internal fan 11 along the outside of the fixing metal fitting 60. In addition, the exhaust port 23 also functions as a blowout port that spirally straightens the flow of the air flow due to the formation position and direction.

Figure 14:
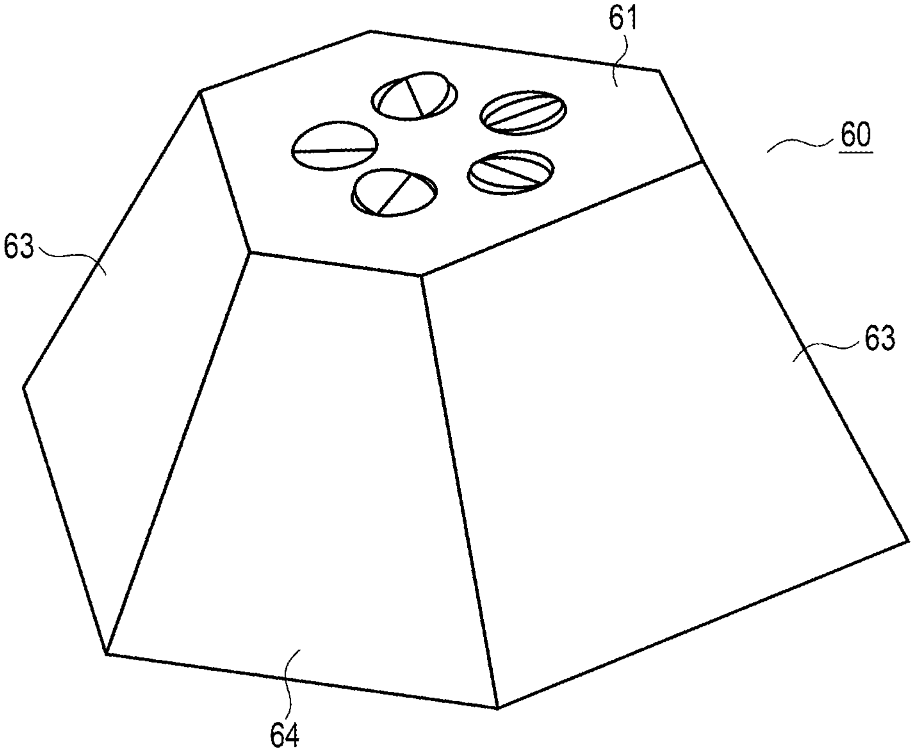
FIG. 14 is an external view illustrating an example of the fixing metal fitting 60.

FIG. 14 is an external view illustrating an example of the fixing metal fitting 60. The fixing metal fitting 60 is a polyhedron including three support faces 63 and three connection faces 64. Each of the support face 63 and the connection face 64 is an isosceles trapezoid, and both form an inclined face to support the antenna substrate at an elevation angle of, for example, 60°. The fixing metal fitting 60 includes the coupling portion 61 having an air guide plate 65, and serves as a ventilation guide that guides the air flow inside the radome 40 along the signal processing substrate 31.

Figure 15A:
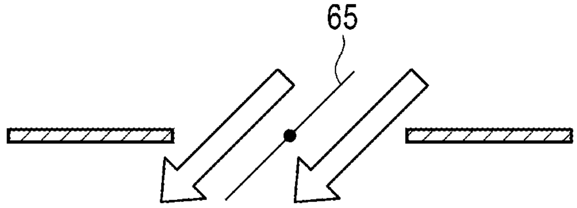
FIG. 15A is a transverse cross-sectional view and a top view of an air guide plate 65.
Figure 15B:
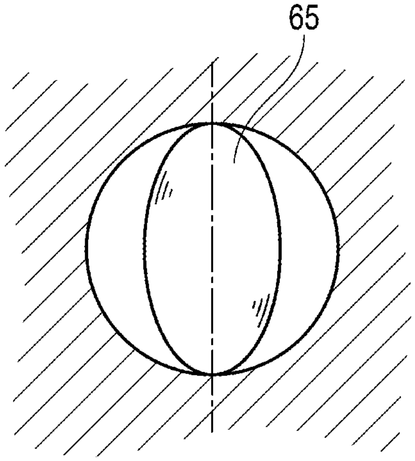
FIG. 15B is a transverse cross-sectional view and a top view of an air guide plate 65.

FIG. 15 is a transverse cross-sectional view and a top view of the air guide plate 65. The air guide plate 65 is, for example, a small disk attached to a circular hole holed in a plane at an oblique angle as shown in FIG. 15A. As illustrated in the top view of FIG. 15B, the air flow path is generated by inclining the air guide plate 65. The inclination angle may be fixed or may be freely swingable around the support axis.

Figure 16:
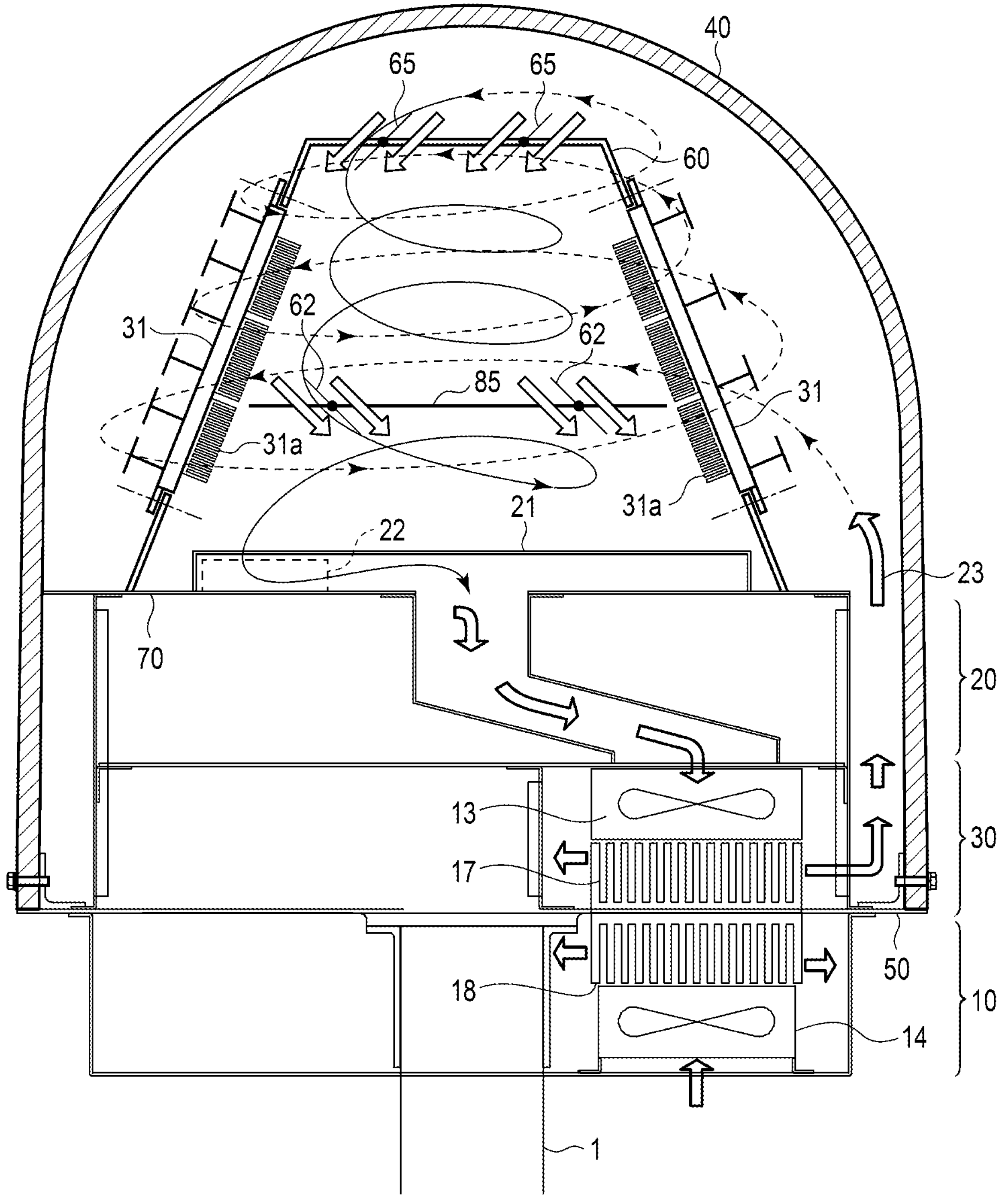
FIG. 16 is a transverse cross-sectional view illustrating another example of the antenna apparatus 100 shown in FIG. 20.

As illustrated in FIG. 16, the fixing metal fitting 60 may have a hexagonal pyramid shape with a flat upper portion, and may have a duct structure in which the air guide plate 65 as an air hole is formed in the coupling portion 61 which is a flat portion and cooling air is blown to the substrates. By disposing the signal processing substrate 31 inside relative to the fixing metal fitting 60 and providing the duct portion 21 branching in three directions on the bottom face of the fixing metal fitting 60, the cooling air flows along the face of the signal processing substrate 31. Further, a partition plate 85 or a slot may be provided in a path of an air flow from the exhaust port 23 to the air guide plate 65. The partition plate 85 has the air guide plate 65 similar to that of the coupling portion 61, so that a spiral flow of an air flow can be promoted.

Figure 17:
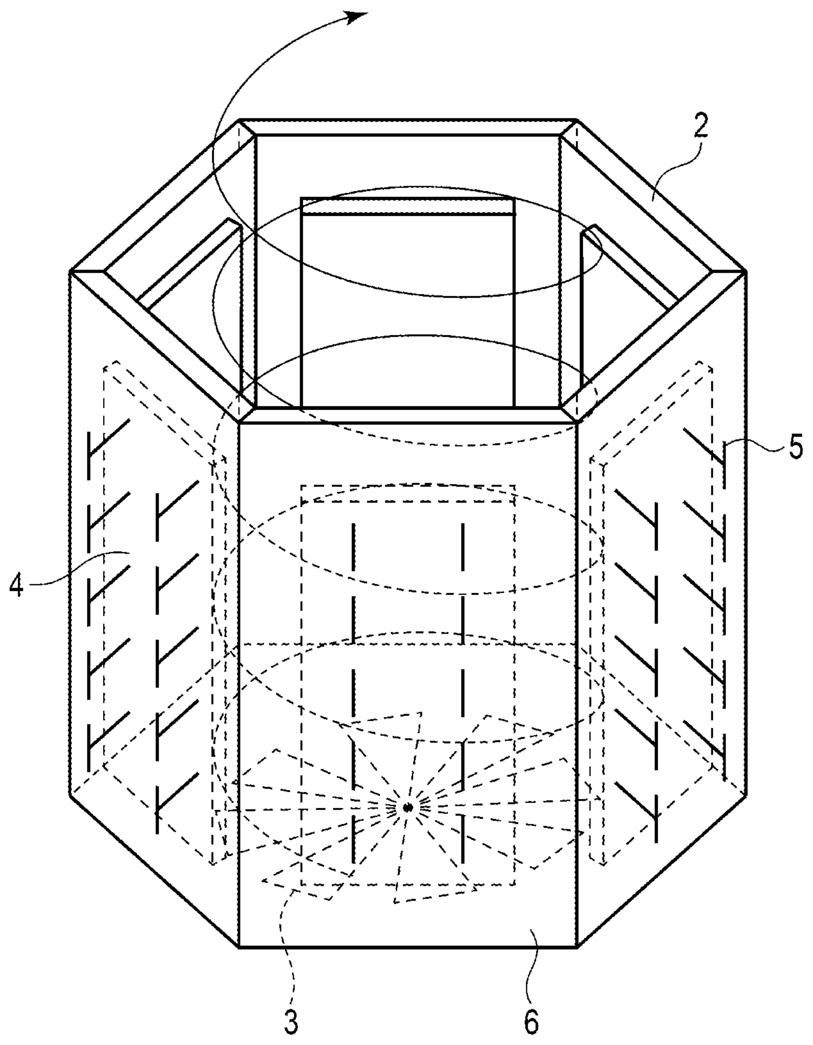
FIG. 17 is an external view illustrating an example of the antenna apparatus to which the air-cooled cooling structure according to the embodiment is applied.

FIG. 17 is an external view illustrating an example of an antenna apparatus to which the air-cooled cooling structure according to the second embodiment is applied. The antenna apparatus shown in FIG. 17 includes a plurality of signal processing substrates including a plurality of antenna elements 5. The signal processing substrate includes an electronic circuit that processes a radio wave captured by the antenna element 5 and converted into an electric signal to generate heat. In the following description, the signal processing substrate is denoted by reference numeral 4 and is collectively referred to as a heating element 4.

The heating element 4 is attached to the inner face of the cylindrical support member 2. In FIG. 17, the support member 2 includes six support faces 6 connected and fixed to each other at long sides, and has a tubular structure. Of course, the number of faces is not limited to six. Each of the support faces 6 has a quadrilateral shape, and is formed in accordance with the size of the heating element 4. In FIG. 17, the axis of the cylindrical structure of the support member 2 is along the vertical lengthwise direction (the extension direction of the cylinder). The top of the tubular structure is released to facilitate escape of the heated air. On the other hand, the air guide portion 3 that generates a spiral air flow inside the cylinder is formed at the bottom of the cylindrical structure.

The air guide portion 3 includes, for example, notch-shaped fin portions disposed in an annular shape. When the heating element 4 generates heat, the heated air flows vertically upward, so that the outside air flows into the support member 2 through the air guide portion 3. At this time, the air hits the fin portion to regulate the flow path of the air flow, thereby generating a spiral air flow with the extension direction of the support member 2 as an axis. This spiral air flow hits the heating element 4 from the lateral direction and takes heat. As described above, not a simple upward air flow but a spiral air flow is hit to the heating element 4, so that cooling efficiency of air cooling can be enhanced.

In FIG. 17, the heating element 4 is attached to the inside of the cylindrical support member 2, the top of the support member 2 is opened, and the fin-shaped air guide portion 3 is formed at the bottom of the support member 2. In this way, a spiral air flow is formed inside the support member 2, and the efficiency of air hitting the heating element 4 is enhanced to enhance the discharge heat efficiency.

Figure 18A:
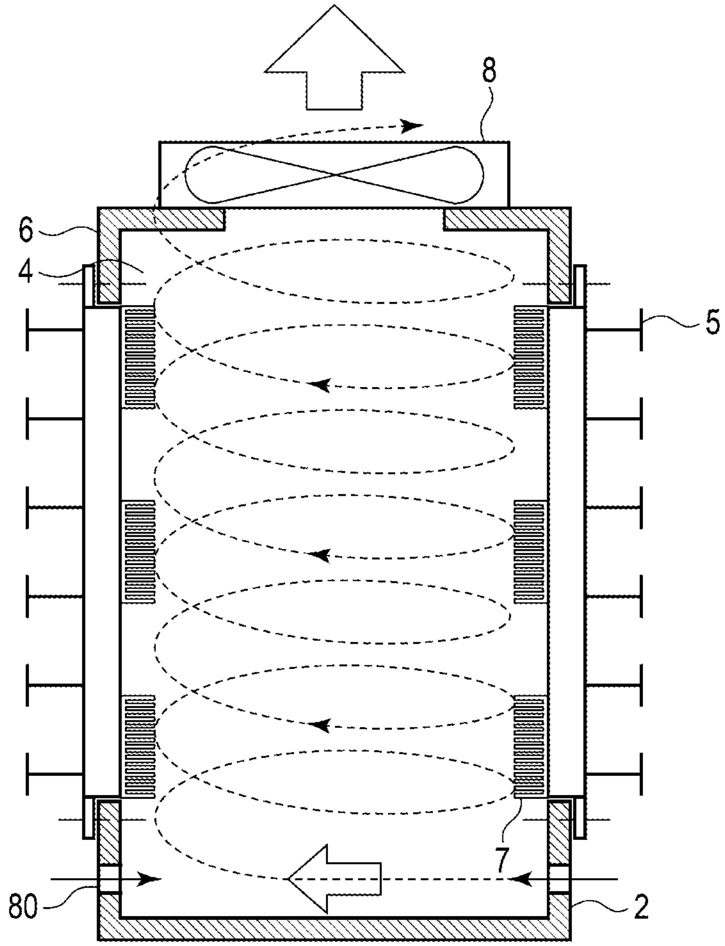
FIG. 18A is a view illustrating another example of the antenna apparatus to which the air-cooled cooling structure according to the embodiment is applied.
Figure 18B:
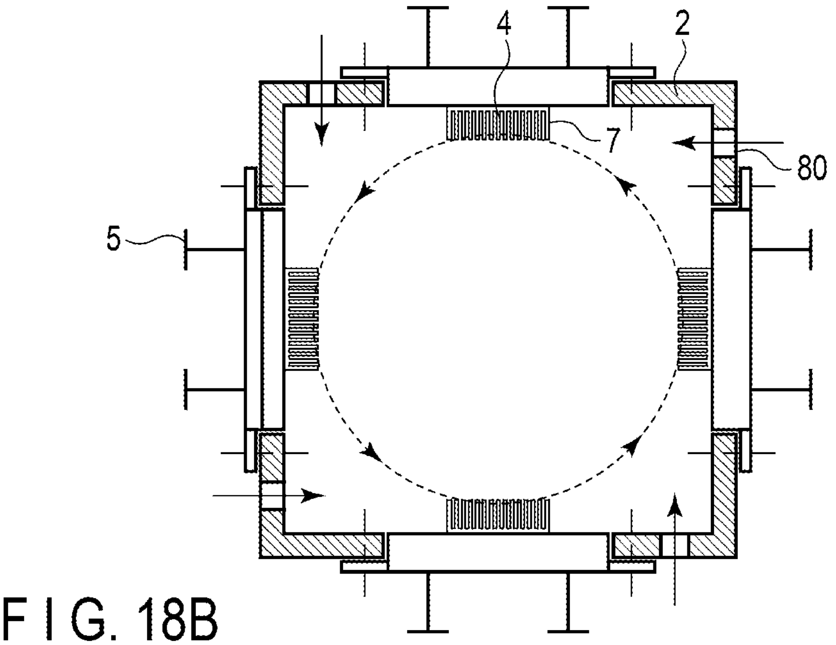
FIG. 18B is a view illustrating another example of the antenna apparatus to which the air-cooled cooling structure according to the embodiment is applied.

FIG. 18 is a diagram illustrating another example of the antenna apparatus to which the air-cooled cooling structure according to the embodiment is applied. FIG. 18A illustrates a side view, and FIG. 18B illustrates a top view. The support member 2 shown in FIG. 18 includes four support faces 6 connected and fixed to each other at long sides. The heating element 4 is attached to each support face 6 from the inside, and the antenna element 5 is exposed to the outside of the tube.

For example, a pin fin type radiator 7 is attached to the heating element 4, particularly a component having a large amount of heat generation or a low allowable temperature. As illustrated in FIG. 18B, the spiral air flow generated inside the support member 2 hits the radiator 7 and takes heat from the heating element 4 and the heat generating component installed therein.

Furthermore, in the configuration shown in FIG. 18, the outer fan 8 is attached to the top portion, and the air intake 80 is formed at the bottom portion. As illustrated in FIG. 18B, the air intake 80 is formed at a position where a spiral air flow is naturally generated by taking in outside air. The rotation direction of the outer fan 8 is more preferably the same as the direction of the spiral air flow. By forming the air intake 80 at an appropriate position and rotating the outer fan 8, the air taken in from the air intake 80 forms a spiral vortex inside the support member 2. As a result, a high cooling effect can be obtained as compared with that of natural air cooling, and the cooling effect can be further enhanced together with the action of the radiator 7.

Figure 19:
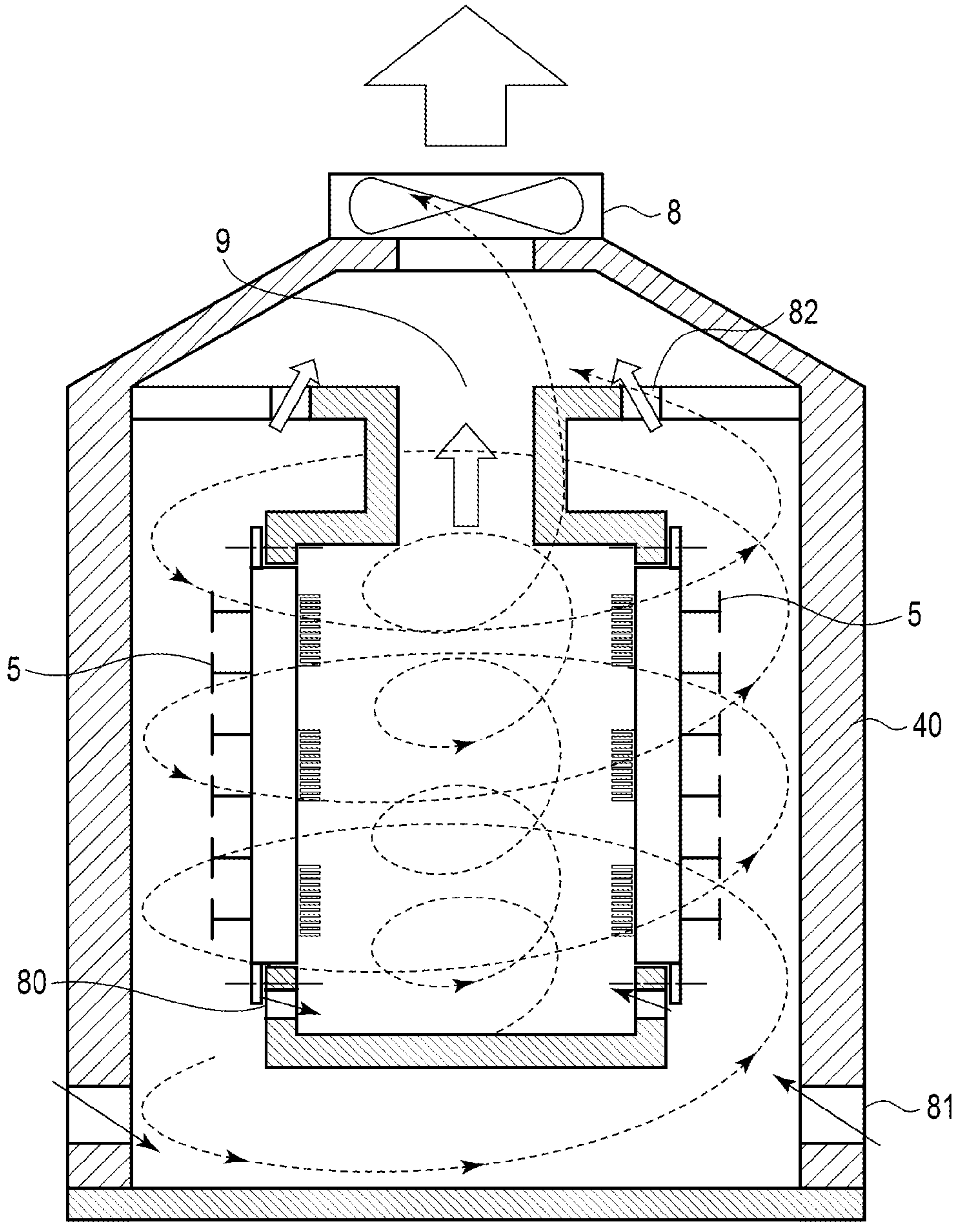
FIG. 19 is a view illustrating another example of the antenna apparatus to which the air-cooled cooling structure according to the embodiment is applied.

FIG. 19 is a diagram illustrating another example of the antenna apparatus to which the air-cooled cooling structure according to the embodiment is applied. The configuration shown in FIG. 19 is an antenna apparatus further including a cover member that covers the configuration shown in FIG. 18. The cover member is configured to cover the entire support member 2 outside the support member 2 with a shaft aligned with the support member 2. Specifically, the cover covering the antenna apparatus is made of a radio wave transmissive material and is referred to as a radome. In the following description, the cover member is denoted by reference numeral 40 and is referred to as a radome 40. Covering with the radome 40 is advantageous in a case where the weather resistance of the antenna element 5 is not sufficient. When the weather resistance of the antenna element 5 is sufficient, it is not always necessary to cover the antenna element 5 with the radome 40.

The radome 40 includes the outer fan 8 at the top and an air intake 81 at the side. The air intake 81 is an air intake for air from the outside, as in the air intake 80 of the support member 2. Here, the air intake 81 may be covered with a filter cover or the like that prevents dust from flowing in from the outside. The air taken in from the air intake 81 spirals in a space formed between the support member 2 and the radome 40, and is an outer air flow flowing along the outer face of the support member 2. This outer air flow is exhausted from the outer fan 8 to the outside of the radome 40 via a ventilation portion 82 formed at the top of the space.

On the other hand, as in FIG. 18, an air flow (inner air flow) is also formed inside the support member 2. The inner air flow is exhausted from the outer fan 8 to the outside of the radome 40 via a ventilation portion 9 formed at the top of the support member 2.

The spiral flow of the inner air flow and the spiral flow of the outer air flow can be realized, for example, by forming the shape of the air intake 81, the ventilation portion 9, or the ventilation portion 82 into a fin or a notch shape that regulates the air flow. Further, it is also possible to form a spiral flow by utilizing the rotation of the propeller of the outer fan 8.

Figure 20:
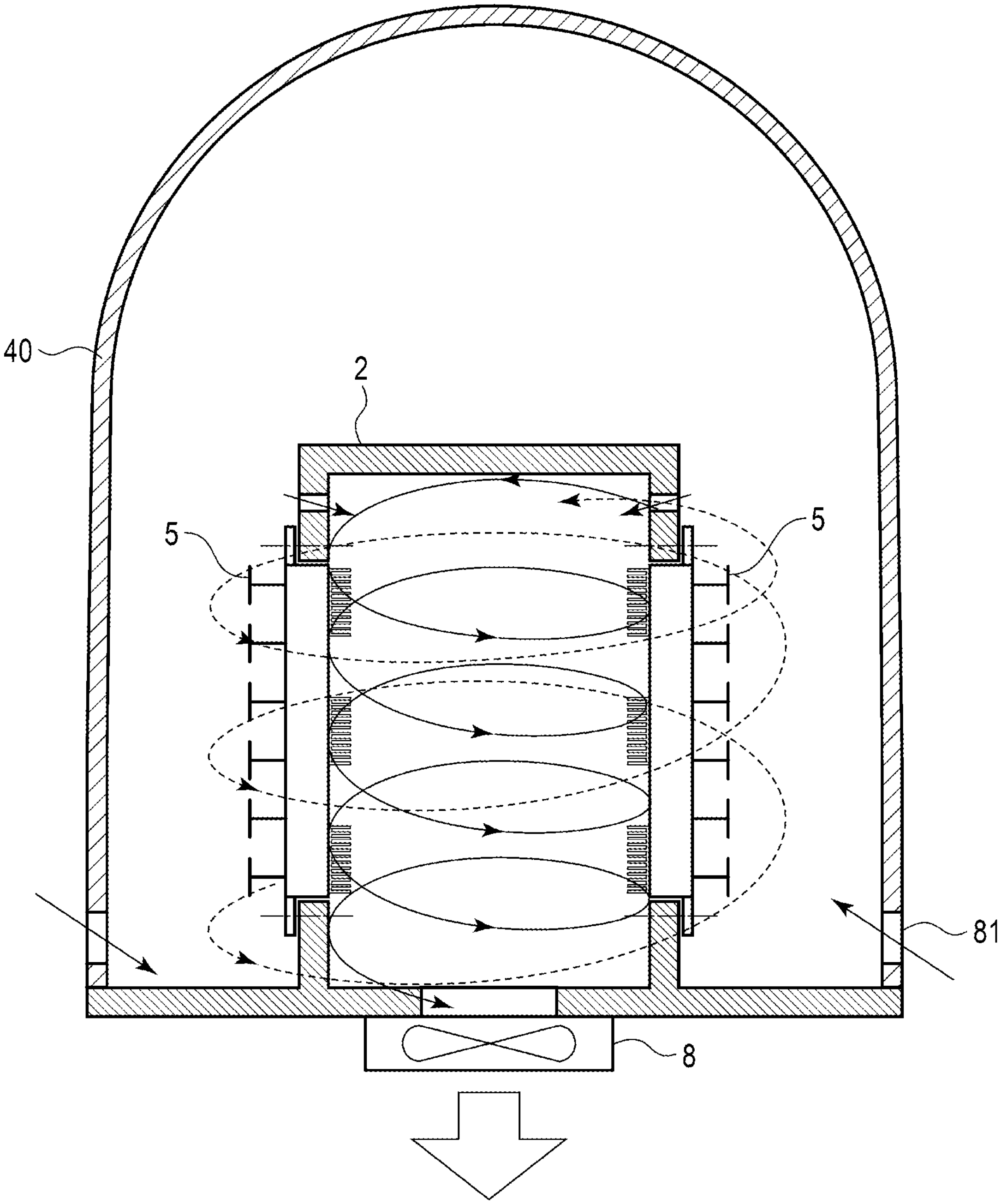
FIG. 20 is a cross-sectional view illustrating another example of the antenna apparatus to which the air-cooled cooling structure according to the embodiment is applied.

FIG. 20 is a cross-sectional view illustrating another example of the antenna apparatus to which the air-cooled cooling structure according to the embodiment is applied. As illustrated in FIG. 20, the structure illustrated in FIG. 19 may be inverted, and the outer fan 8 may be attached to the bottom. Also in the configuration shown in FIG. 20, the air taken in from the air intake 81 is exhausted from the outer fan 8 as a spiral outer air flow and a spiral inner air flow. The outer air flow takes heat from the antenna element 5 or the like exposed to the outer face of the support member 2, and the inner air flow takes heat from the heating element 4 attached to the inner face of the support member 2. By making the air flow spiral, it is possible to efficiently discharge heat. A structure for cooling an electronic device inside the radome 40 with air without air exchange inside and outside the radome 40 will be described in more detail.

Figure 21:
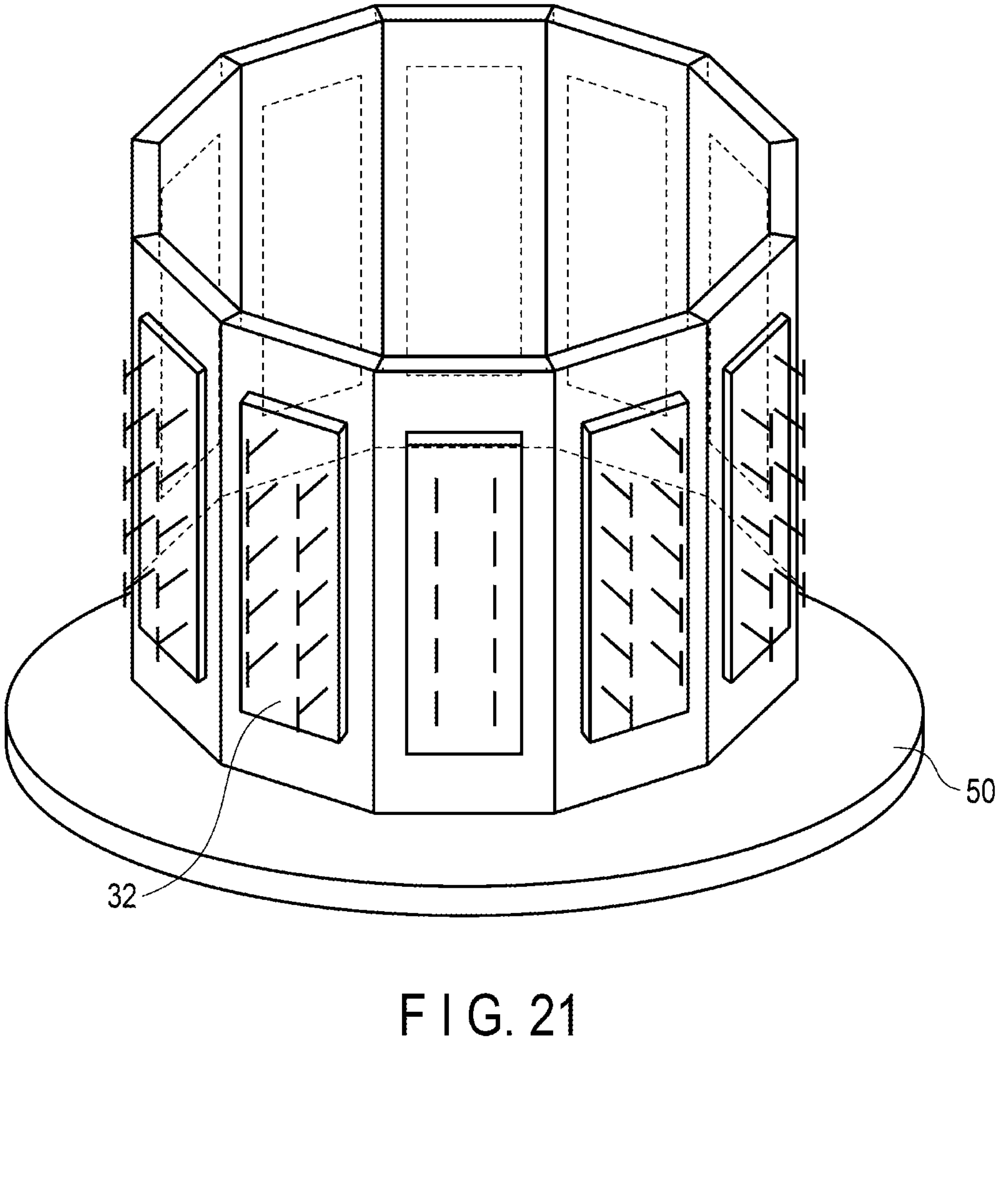
FIG. 21 is a perspective view illustrating another example of the antenna apparatus 100.

FIG. 21 is a perspective view illustrating another example of the antenna apparatus 100. In the embodiment, the four-face or six-face support member is disclosed. The present invention is not limited to this, and a large number of faces may be provided to monitor 360° in the azimuth direction. For example, as illustrated in FIG. 21, this configuration can be easily realized by attaching a columnar fixing metal fitting including a plurality of support faces to the base plate 50 and attaching an antenna substrate to each face.

As illustrated in FIG. 21, the heating elements such as the signal processing substrate 31 may be disposed in a polygonal shape. Furthermore, as the number of substrates is increased and the tubular structure of the support member 2 is closer to a circular shape, the resistance of the air flow is reduced and the spiral air flow is easily generated.

As described above, according to the second embodiment, it is possible to provide an air-cooled cooling structure and an antenna apparatus having a simple structure and increasing cooling efficiency.

Note that the present invention is not limited to the above embodiment. In the first embodiment, the structure in which the detection of 360° in the azimuth direction is performed with three planes, that is, the arrangement of the antenna substrate fixing metal fitting having a hexahedron in two frequency bands is disclosed. The present invention is not limited to this, when the detection at 360° in the azimuth direction is performed on the N1 planes, and the frequency band corresponds to 3 to N2 types, the detection can be realized by the arrangement of the antenna substrate corresponding to each frequency band and the antenna substrate fixing metal fitting having an N1×N2 hedron. In this way, it is possible to cope with the needs of the detection device in use of a plurality of frequency bands. In addition, by increasing the N1 plane in the horizontal direction, the detection accuracy can be improved.

Although several embodiments have been described, these embodiments are presented as examples and are not intended to limit the scope of the invention. These novel embodiments can be implemented in various other forms, and various omissions, substitutions, and changes can be made without departing from the gist of the invention. These embodiments and modifications thereof are included in the scope and gist of the invention, and are included in the invention described in the claims and the equivalent scope thereof.

The invention claimed is:

1. An air-cooled cooling structure comprising:
a base plate;
a radome attached to the base plate;
a first heat transfer member attached to the base plate in a space formed by the radome and the base plate;
an internal fan that generates an air flow to the first heat transfer member in the space;
a fixing member that serves as a support member that supports a plurality of antenna substrates and a signal processing unit in the space and a ventilation guide that guides the air flow along the signal processing unit; and
a second heat transfer member attached to the base plate, the second heat transfer member being thermally coupled to the first heat transfer member at a face facing an attachment face of the first heat transfer member.

2. The air-cooled cooling structure according to claim 1, further comprising: an outer fan that air-cools the second heat transfer member to discharge heat of the air flow.

3. The air-cooled cooling structure according to claim 1, wherein
the fixing member includes
a plurality of inclined faces supporting the respective antenna substrate at a constant elevation angle, and
a coupling member that supports the plurality of inclined faces and has a ventilation hole, and wherein
the ventilation guide guides the air flow to the signal processing unit via the ventilation hole.

4. The air-cooled cooling structure according to claim 3, wherein
the plurality of inclined faces includes
a plurality of isosceles trapezoidal support faces that supports an antenna substrate of a first frequency band, and
a plurality of connection faces that is interposed between the plurality of support faces and supports an antenna substrate of a second frequency band higher than the first frequency band.

5. The air-cooled cooling structure according to claim 4, wherein the signal processing unit is attached to a face opposite to the support face to which the antenna substrate of the first frequency band is attached, and is electrically connected to the antenna substrate of the first frequency band and the antenna substrate of the second frequency band.

6. The air-cooled cooling structure according to claim 5, comprising:
a first to third antenna substrates of the first frequency band and a fourth to sixth antenna substrates of the second frequency band, wherein
the plurality of inclined faces includes
a first support face that supports the first antenna substrate,
a second support face that supports the second antenna substrate,
a third support face that supports the third antenna substrate,
a first connection face that is interposed between the first support face and the second support face and supports the fourth antenna substrate,
a second connection face that is interposed between the second support face and the third support face and supports the fifth antenna substrate, and
a third connection face that is interposed between the third support face and the first support face and supports the sixth antenna substrate.

7. The air-cooled cooling structure according to claim 4, comprising:
a first to third antenna substrates of the first frequency band and a fourth to sixth antenna substrates of the second frequency band, wherein
the plurality of inclined faces includes
a first support face that supports the first antenna substrate,
a second support face that supports the second antenna substrate,
a third support face that supports the third antenna substrate,
a first connection face that is interposed between the first support face and the second support face and supports the fourth antenna substrate,
a second connection face that is interposed between the second support face and the third support face and supports the fifth antenna substrate, and
a third connection face that is interposed between the third support face and the first support face and supports the sixth antenna substrate.

8. An antenna apparatus that detects a flying object that emits radio waves, the antenna apparatus comprising:
a base plate;
a radome attached to the base plate;
a first heat transfer member attached to the base plate in a space formed by the radome and the base plate;
an internal fan that generates an air flow to the first heat transfer member in the space;
a fixing member that serves as a support member that supports the plurality of antenna substrates that captures the radio waves and a signal processing unit, and a ventilation guide that guides the air flow along the signal processing unit in the space; and
a second heat transfer member attached to the base plate, the second heat transfer member being thermally coupled to the first heat transfer member at a face facing an attachment face of the first heat transfer member.

9. An air-cooled cooling structure that cools a heating element with air, the air-cooled cooling structure comprising:
a support member that supports the heating element on an inner face; and
an air guide portion that generates a spiral air flow with an extension direction of the support member as an axis inside the support member.

10. The air-cooled cooling structure according to claim 9, wherein
the air guide portion includes
an air intake opened to an outside of the support member.

11. The air-cooled cooling structure according to claim 10, wherein
the air guide portion includes
an exhaust port that exhausts air taken in from the air intake from an inside of the support member to an outside of the support member.

12. The air-cooled cooling structure according to claim 11, wherein at least any one of the air intake and the exhaust port opens in a circumferential direction of the support member.

13. The air-cooled cooling structure according to claim 9, comprising:

a base plate;

a radome attached to the base plate;

a first heat transfer member attached to the base plate in a space formed by the radome and the base plate;

an internal fan that generates an air flow circulating to the first heat transfer member in the space;

a support member that supports a plurality of antenna substrates and a signal processing unit in the space; and a duct portion that regulates a flow path of an air flow that absorbs heat of the signal processing unit and guides the air flow to the first heat transfer member, wherein the duct portion includes an air intake that forms the air flow in a spiral shape along the signal processing unit.

14. The air-cooled cooling structure according to claim 13, wherein the support member is a fixing member that serves as a ventilation guide that guides the air flow along the signal processor, and wherein the air-cooled cooling structure further comprises: a second heat transfer member attached to the base plate, the second heat transfer member being thermally coupled to the first heat transfer member at a face facing an attachment face of the first heat transfer member.

15. The air-cooled cooling structure according to claim 14, further comprising:

an intermediate plate that forms a plane parallel to the base plate and attaches and supports the support member in the space, wherein the intermediate plate includes an exhaust port that circulates the air flow whose heat is discharged by the first heat transfer member in the space, and wherein the exhaust port includes a blowout port that spirally straightens a flow of the air flow.

16. The air-cooled cooling structure according to claim 15, wherein the support member includes a plurality of inclined faces each supporting the antenna substrate at a constant elevation angle, and a coupling member including an air guide plate that supports the plurality of inclined faces and spirally straightens a flow of the air flow.

17. An antenna device comprising:

an air-cooled cooling structure that cools a signal processing substrate electrically connected to an antenna substrate with air, wherein the air-cooled cooling structure includes a support member that supports the signal processing substrate on an inner face, and an air guide portion that generates a spiral air flow with an extension direction of the support member as an axis inside the support member.

* * * * *